(12) United States Patent
Shishime et al.

(10) Patent No.: US 8,851,050 B2
(45) Date of Patent: Oct. 7, 2014

(54) SPARK-IGNITION ENGINE CONTROL METHOD AND SYSTEM

(75) Inventors: Kouji Shishime, Hiroshima (JP); Naoya Matsuo, Higashihiroshima (JP); Mikinori Ohashi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 781 days.

(21) Appl. No.: 13/038,156

(22) Filed: Mar. 1, 2011

(65) Prior Publication Data

US 2011/0239986 A1 Oct. 6, 2011

(30) Foreign Application Priority Data

Mar. 31, 2010 (JP) .................. 2010-081261

(51) Int. Cl.
 *F02P 5/04* (2006.01)
 *F02D 41/40* (2006.01)
 *F02D 15/00* (2006.01)
 *F02D 35/02* (2006.01)
 *F02D 13/02* (2006.01)
 *F02B 75/12* (2006.01)

(52) U.S. Cl.
 CPC .............. *F02D 41/401* (2013.01); *F02D 15/00* (2013.01); *Y02T 10/12* (2013.01); *Y02T 10/142* (2013.01); *F02D 2200/025* (2013.01); *F02D 35/021* (2013.01); *Y02T 10/123* (2013.01); *F02D 13/0269* (2013.01); *F02D 35/027* (2013.01); *F02B 2075/125* (2013.01); *Y02T 10/44* (2013.01); *F02D 13/0238* (2013.01)
 USPC .................. 123/406.29; 123/406.47; 701/111

(58) Field of Classification Search
 USPC ......... 123/90.15–90.18, 305, 406.29, 406.45, 123/406.47, 435, 690, 479; 701/103, 104, 701/105, 111
 See application file for complete search history.

(56) References Cited

U.S. PATENT DOCUMENTS

| | | | | |
|---|---|---|---|---|
| 7,533,651 | B2 * | 5/2009 | Surnilla ...................... | 123/304 |
| 8,096,283 | B2 * | 1/2012 | Surnilla et al. ............ | 123/406.29 |
| 8,127,745 | B2 * | 3/2012 | Surnilla et al. ............ | 123/406.29 |
| 8,291,888 | B2 * | 10/2012 | Itano ........................ | 123/406.38 |

(Continued)

FOREIGN PATENT DOCUMENTS

| | | |
|---|---|---|
| JP | 2001-159348 A | 6/2001 |
| JP | 2002-339780 A | 11/2002 |

*Primary Examiner* — Thomas Moulis
*Assistant Examiner* — Elizabeth Hadley
(74) *Attorney, Agent, or Firm* — Studebaker & Brackett PC

(57) ABSTRACT

When preignition is detected, and an engine speed is less than a predetermined value (Nex), an air/fuel ratio is enriched (S22), and then, when the preignition is detected even after enriching the air/fuel ratio, an effective compression ratio of an engine is reduced (S23), whereafter, when the preignition is detected even after reducing the effective compression ratio, a part of injection fuel is injected in a compression stroke (S24). On the other hand, when preignition is detected, and an engine speed is equal to or greater than the predetermined value (Nex), the air/fuel ratio is enriched (S31), and then, when the preignition is detected even after enriching the air/fuel ratio, a part of the fuel is injected in the compression stroke (S32). This makes it possible to effectively suppress the occurrence of preignition while maximally avoiding deterioration in emission performance and lowering in engine power output.

8 Claims, 12 Drawing Sheets

(56) References Cited

U.S. PATENT DOCUMENTS

| | | | |
|---|---|---|---|
| 8,387,591 B2* | 3/2013 | Surnilla et al. | 123/406.29 |
| 8,392,094 B2* | 3/2013 | Makino et al. | 701/102 |
| 8,543,315 B2* | 9/2013 | Glugla et al. | 701/103 |
| 8,639,432 B2* | 1/2014 | Matsuo et al. | 701/111 |
| 8,706,382 B2* | 4/2014 | Oba et al. | 701/104 |
| 2007/0215130 A1* | 9/2007 | Shelby et al. | 123/637 |
| 2011/0246049 A1* | 10/2011 | Matsuo et al. | 701/111 |
| 2012/0271533 A1* | 10/2012 | Shishime | 701/105 |

\* cited by examiner

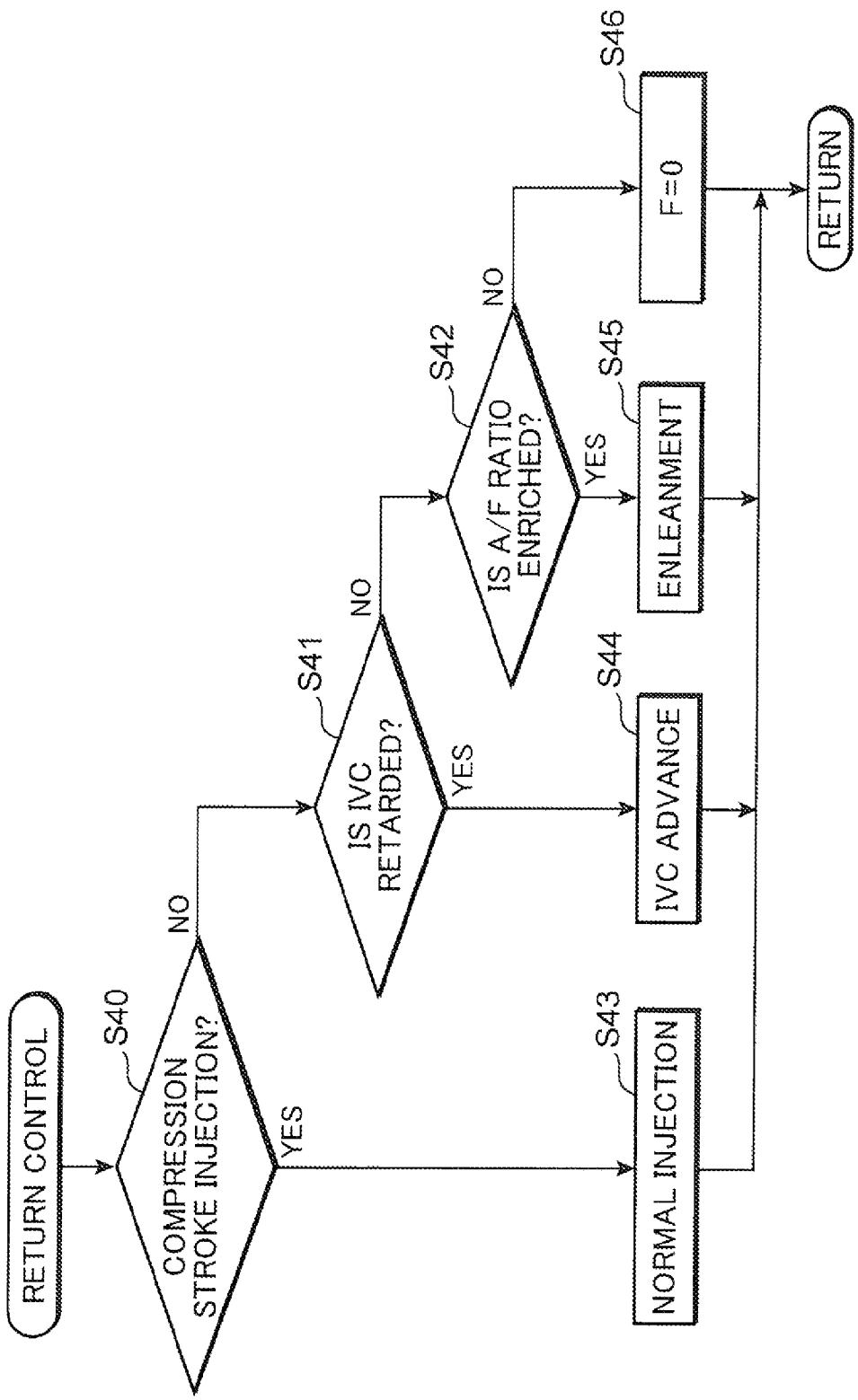

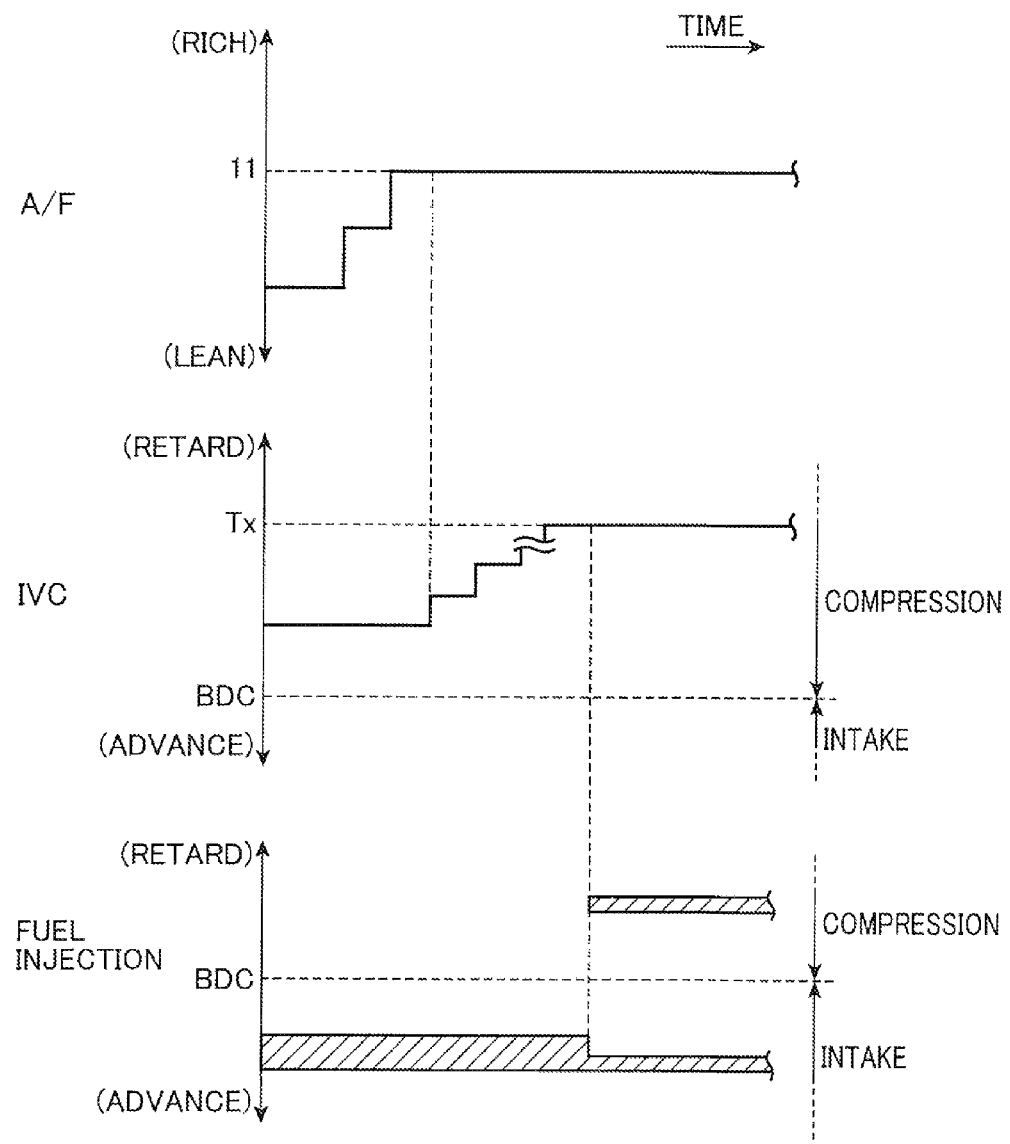

SPARK-IGNITION ENGINE CONTROL METHOD AND SYSTEM

BACKGROUND OF THE INVENTION

1. Field of the Invention

The present invention relates to a method and a system for controlling a spark-ignition engine which comprises an abnormal combustion detection device for detecting a preignition which is a phenomenon that an air-fuel mixture self-ignites before a spark-ignited normal combustion initiation timing, an injector for directly injecting fuel into a cylinder, and a variable mechanism for variably setting an intake valve opening timing.

2. Description of the Background Art

Heretofore, in an in-cylinder direct injection engine comprising an injector for directly injecting fuel into a cylinder (combustion chamber) and a spark plug for spark-igniting an air-fuel mixture in the cylinder, a technique has been implemented which is designed to detect whether abnormal combustion where an air-fuel mixture self-ignites before a spark-ignited normal combustion initiation timing (hereinafter referred to as "preignition") occurs, and, when the preignition is detected, to retard a fuel injection timing from the injector, as disclosed, for example, in JP 2002-339780A (hereinafter referred to as "Patent Document 1").

More specifically, in the Patent Document 1, in a normal state, a fuel injection timing is set in an intake stroke, whereas, when the preignition is detected, the fuel injection timing is retarded to inject fuel in a compression stroke so as to shorten a period of time between the fuel injection timing and a spark timing (spark ignition timing) (i.e., shorten a heat-receiving period of fuel) to suppress the occurrence of the preignition.

As a method for suppressing the preignition, there has also been known a technique disclosed in JP 2001-159348A (hereinafter referred to as "Patent Document 2"). In the technique disclosed in the Patent Document 2, when an engine speed is equal to or less than a predetermined value, and an amount of change of a required torque in an increasing direction is equal to or less than a predetermined value, it is determined that an engine is under a condition that the preignition is likely to occur. Then, under this condition, an intake valve closing timing is shifted to reduce the effective compression ratio so as to lower an in-cylinder temperature/pressure to suppress the occurrence of the preignition.

The preignition can be suppressed to prevent the occurrence of combustion noise and engine vibration by employing one of the techniques in the Patent Documents 1 and 2. However, when the fuel injection timing is retarded to the combustion stroke, as in the Patent Document 1, an spark ignition operation is performed in a situation where vaporization/atomization of injected fuel is still insufficient, so that a large amount of unburned carbon remains in exhaust gas to produce smoke, which causes a problem of deterioration in emission performance.

On the other hand, when the intake valve closing timing is shifted to reduce the effective compression ratio, as in the Patent Document 2, there is no concern about the occurrence of smoke. However, it involves a problem of lowering in engine power output.

SUMMARY OF THE INVENTION

In view of the above circumstances, it is an object of the present invention to provide a spark-ignition engine control method and system capable of effectively suppressing the occurrence of preignition while maximally avoiding deterioration in emission performance and lowering in engine power output.

In order to achieve the above abject, the present invention provided a method of controlling a spark-ignition engine which comprises a detection device for detecting a preignition which is a phenomenon that an air-fuel mixture self-ignites before a spark-ignited normal combustion initiation timing, an injector for directly injecting fuel into a cylinder, and a variable mechanism for variably setting an intake valve closing timing. The method comprises the steps of: executing a first preignition avoidance control as a control mode to be performed when the preignition is detected based on a detection value of the detection device, and it is ascertained that an engine speed is less than a predetermined value; and executing a second preignition avoidance control as a control mode to be performed when the preignition is detected based on the detection value of the detection device, and it is ascertained that the engine speed is equal to or greater than the predetermined value. The first preignition avoidance control includes a first control operation of increasing a fuel injection amount from the injector to enrich an air/fuel ratio in the cylinder, a second control operation of, when the preignition is detected even after the first control operation, shifting the intake valve closing timing using the variable mechanism to reduce an effective compression ratio of the engine, and a third control operation of, when the preignition is detected even after the second control operation, retarding an injection timing of a part of fuel to be injected from the injector, to a medium or later phase of a compression stroke. The second preignition avoidance control includes a fourth control operation of increasing a fuel injection amount from the injector to enrich the in-cylinder air/fuel ratio, a fifth control operation of, when the preignition is detected even after the fourth control operation, retarding an injection timing of a part of fuel to be injected from the injector, to the medium or later phase of the compression stroke.

The present invention also provides a control system for a spark-ignition engine. The control system comprises: a detection device for detecting a preignition which is a phenomenon that an air-fuel mixture self-ignites before a spark-ignited normal combustion initiation timing; an injector for directly injecting fuel into a cylinder; a variable mechanism for variably setting an intake valve closing timing; and a controller for controlling the injector and the variable mechanism. The controller is operable to execute: a first preignition avoidance control as a control mode to be performed when the preignition is detected based on a detection value of the detection device, and it is ascertained that an engine speed is less than a predetermined value; and a second preignition avoidance control as a control mode to be performed when the preignition is detected based on the detection value of the detection device, and it is ascertained that the engine speed is equal to or greater than the predetermined value. The first preignition avoidance control includes a first control operation of increasing a fuel injection amount from the injector to enrich an air/fuel ratio in the cylinder, a second control operation of, when the preignition is detected even after the first control operation, shifting the intake valve closing timing using the variable mechanism to reduce an effective compression ratio of the engine, and a third control operation of, when the preignition is detected even after the second control operation, retarding an injection timing of a part of fuel to be injected from the injector, to a medium or later phase of a compression stroke. The second preignition avoidance control includes a fourth control operation of increasing a fuel injection amount from the injector to enrich the in-cylinder air/fuel ratio, a fifth control operation of, when the preignition is detected even after the fourth control operation, retarding an injection timing of a part of fuel to be injected from the injector, to the medium or later phase of the compression stroke.

BRIEF DESCRIPTION OF THE DRAWINGS

FIG. 8 is a flowchart showing details of a return control subroutine included in the flowchart illustrated in FIG. 5.

FIG. 9B illustrates a fuel injection timing in the event of the preignition.

FIG. 10 is a time chart showing one example of an operation for the first preignition avoidance control, in a time-series manner.

DESCRIPTION OF THE PREFERRED EMBODIMENTS (1) Overall Structure of Engine

Figure 1:
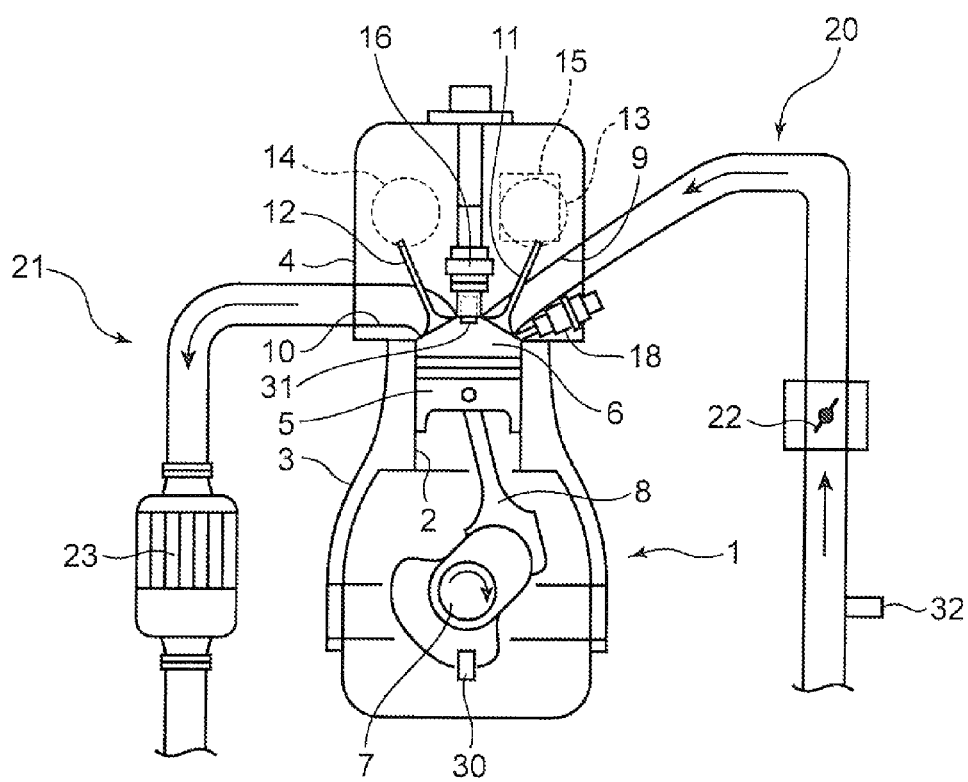
FIG. 1 is a schematic diagram showing an overall structure of a spark-ignition engine employing a control system according to one embodiment of the present invention.

FIG. 1 is a schematic diagram showing an overall structure of a spark-ignition engine employing a control system according to one embodiment of the present invention. The engine illustrated in FIG. 1 is a multicylinder gasoline engine having an engine body 1 which comprises a cylinder block 3 having a plurality of cylinders 2 arranged side-by-side in a direction perpendicular to a surface of the drawing sheet (In FIG. 1, only one of the cylinders 2 is illustrated), and a cylinder head 4 provided on the cylinder block 3. The engine is a vehicle-mounted engine which is provided in a non-illustrated engine compartment, as a power source for driving of vehicle running A piston 5 is inserted into each of the cylinders 2 of the engine body 1 in a reciprocatingly slidable manner. The piston 5 is connected to a crankshaft 7 through a connecting rod 8, in such a manner that the crankshaft 7 is rotated about its central axis according to a reciprocating movement of the piston 5.

The cylinder block 3 is provided with an engine speed sensor 30 for detecting a rotation speed of the crankshaft 7 as an engine speed.

In each of the cylinders 2, a combustion chamber 6 is defined above the piston 5. An intake port 9 and an exhaust port 10 are opened to the combustion chamber 6, and an intake valve 11 and an exhaust valve 12 are provided to the cylinder head 4 to open and close respective ones of the intake and exhaust ports 9, 10. Each of the intake valve 11 and the exhaust valve 12 is adapted to be driven in an openable/closable manner by a respective one of two valve operating mechanisms 13, 14 including a pair of camshafts (illustration is omitted) installed in the cylinder head 4, in conjunction with the rotation of the crankshaft 7.

A VVT mechanism 15 is incorporated in the valve operating mechanism 13 for the intake valve 11. The VVT mechanism 15 stands for Variable Valve Timing mechanism which is a variable mechanism for variably setting an operating timing of the intake valve 11.

As the VVT mechanism 15, various types have already been put to practical use and publicly known. For example, a hydraulic type may be used as the VVT mechanism 15. Although illustration is omitted, the hydraulic-type VVT mechanism comprises a driven shaft disposed in concentric relation to the camshaft for the intake valve 11, and a plurality of hydraulic chambers disposed between the camshaft and the driven shaft and arranged side-by-side along a circumferential direction, wherein it is adapted to provide a given pressure difference between the hydraulic chambers so as to generate a phase difference between the camshaft and the driven shaft. Based on the above structure, the hydraulic-type VVT mechanism is operable to variably set the phase difference within a given angular range so as to continuously change the operating timing of the intake valve 11.

Alternatively, a type designed to change a valve lift amount so as to change a closing timing of the intake valve 11 may be provided as the VVT mechanism 15. Further, this variable valve lift mechanism may be used in combination with the above variable phase shift mechanism.

The cylinder head 4 of the engine body 1 is provided with a spark plug 16 and an injector 18 in pairs for each of the cylinders 2.

The injector 18 is provided to be exposed to the combustion chamber 6 from a lateral side of an intake-side region thereof, and adapted to receive fuel (gasoline) from a non-illustrated fuel supply pipe, and inject the fuel from a distal end thereof into the combustion chamber 6. Specifically, the injector 18 is operable to inject the fuel into the combustion chamber 6, for example, in an intake stroke of the engine, so as to mix the injected fuel with air to form an air-fuel mixture having a desired air/fuel ratio in the combustion chamber 6.

The spark plug 16 is provided to be exposed to the combustion chamber 6 from thereabove, and adapted to generate a spark discharge at a distal end thereof in response to power feeding from a non-illustrated ignition circuit. Specifically, the spark plug 16 is operable to generate a spark discharge at a given spark timing set around a compression top dead center (top dead canter (TDC) of a compression stroke) so as to trigger initiation of combustion of the air-fuel mixture.

An ion current censor 31 is provided adjacent to the spark plug 16 to detect a flame formed by combustion of an air-fuel mixture in the combustion chamber 6. The ion current sensor 31 has an electrode to which a bias voltage, for example, of about 100 V, is applied, wherein it is adapted to detect an ion current generated when a flame is formed around the electrode, so as to detect the flame.

The ion current sensor 31 can be used to detect preignition which is a phenomenon that an air-fuel mixture self-ignites before a spark-ignited normal combustion initiation timing (a normal initiation timing of combustion triggered by spark ignition). Specifically, when spark ignition is performed by the spark plug 16, combustion will be normally initiated after a given delay (lag) time. However, for example, in a situation where a temperature and a pressure of the combustion chamber 6 (i.e., an in-cylinder temperature and an in-cylinder pressure) are excessively increased, an air-fuel mixture is likely to self-ignite before the normal combustion initiation timing. Therefore, in order to detect abnormal combustion due to the self-ignition of the air-fuel mixture (preignition), the ion current sensor 31 is provided to detect a flame, wherein, when a detection timing of the flame (flame formation timing) is excessively earlier than (premature as compared to) the normal combustion initiation timing, it is determined that the preignition occurs. Thus, in this embodiment, the ion current sensor 31 for detecting a flame based on an ion current corresponds to "detection device for detecting preignition" as set forth in the appended claims.

Figure 3:
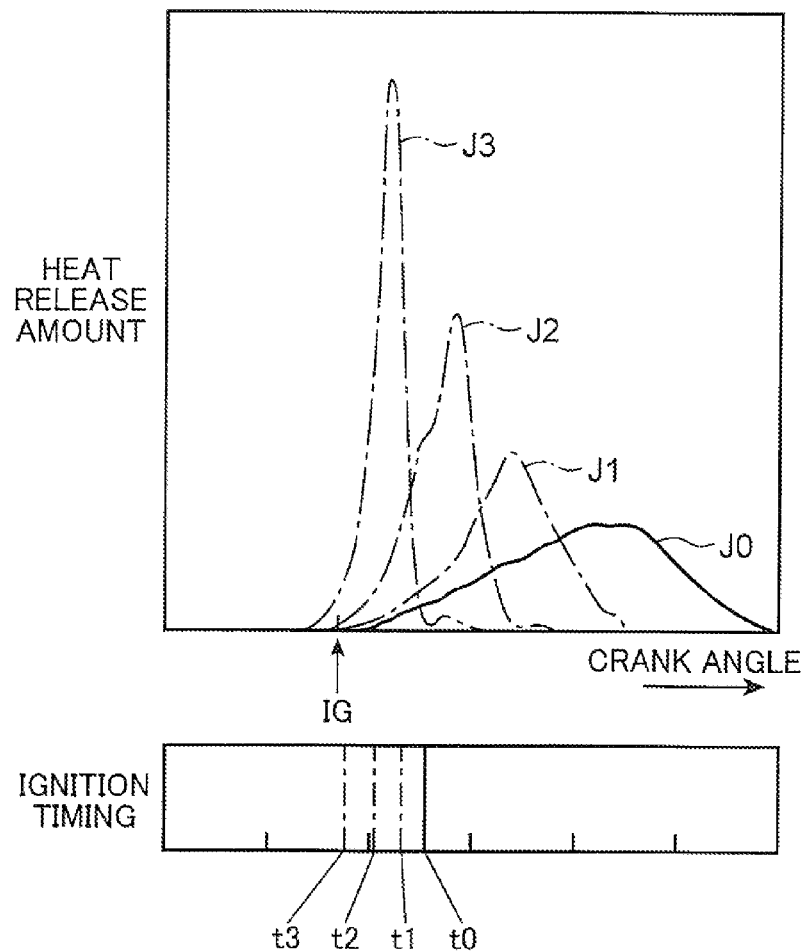
FIG. 3 is an explanatory chart showing a preignition detection method.

With reference to FIG. 3, a preignition detection method using the ion current sensor 31 will be specifically described. In FIG. 3, the solid waveform J0 shows a distribution (temporal change) of a heat release amount during normal combustion of an air-fuel mixture triggered by spark ignition IG. In the waveform J0 during the normal combustion, t0 indicates a point when combustion progresses to a level where a flame can be detected by the ion current sensor 31 (i.e., a substantial combustion initiation timing). The point t0 is late with respect to the point of the spark ignition IG by a given crank angle.

On the other hand, a distribution of a heat release amount in the event of the preignition is indicated by the dashed-dotted waveforms J1 to J3. The waveform J1, the waveform J2 and the waveform J3 indicate mild preignition, medium preignition and serious preignition, respectively, and substantial combustion initiation timings of the mild, medium and serious preignitions are indicated by t1, t2 and t3, respectively. As is clear from the waveforms J1 to J3, once the preignition occurs, combustion is initiated at a timing earlier than the normal combustion initiation timing t0, and a combustion period becomes shorter (i.e., combustion becomes steeper or more rapid). Particularly, if the preignition develops into the serious preignition (J3), the combustion becomes extremely rapid to cause fairly large noise and vibration in an engine, which leads to damage of a piston, etc.

Therefore, in this embodiment, with a view to preventing the preignition from developing into the serious level, when the ion current sensor 31 detects a flame at a timing earlier than the normal combustion initiation timing t0 by a given time, it is determined that the detected flame is caused by the preignition, and a required countermeasure is taken. In this process, in order to detect the preignition when it is at a level as close to mild as possible, it is preferable that the determination on the occurrence of the preignition is made when a flame detection timing by the ion current sensor 31 becomes earlier and comes close, for example, to the point t1.

Returning to FIG. 1, the overall structure of the engine will be further described. An intake passage 20 and an exhaust passage 21 are connected to respective ones of the intake port 9 and the exhaust port 10 of the engine body 1. Specifically, external air (flesh air) for combustion is supplied to the combustion chamber 6 via the intake passage 20, and burned gas (exhaust gas) produced in the combustion chamber 6 is discharged to an outside of the engine via the exhaust passage 21.

The intake passage 20 is provided with a throttle valve 22 for adjusting a flow rate of intake air flowing into the engine body 1, and an airflow sensor 32 for detecting the flow rate of intake air.

The throttle valve 22 is comprised of an electronically-controlled throttle valve adapted to be electrically driven in an openable/closable manner according to an angle of a non-illustrated accelerator pedal to be operated (depressed) by a driver. Specifically, the accelerator pedal is provided with an accelerator-pedal angle sensor 33 (FIG. 2), and the throttle valve 22 is adapted to be driven in an openable/closable manner by a non-illustrated electric actuator, according to an accelerator-pedal angle detected by the accelerator-pedal angle sensor 33.

The exhaust passage 21 is provided with a catalytic converter 23 for purifying exhaust gas. For example, the catalytic converter 32 houses a three-way catalyst to purify harmful components contained in exhaust gas passing through the exhaust passage 21 by an action of the three-way catalyst.

(2) Control System

Figure 2:
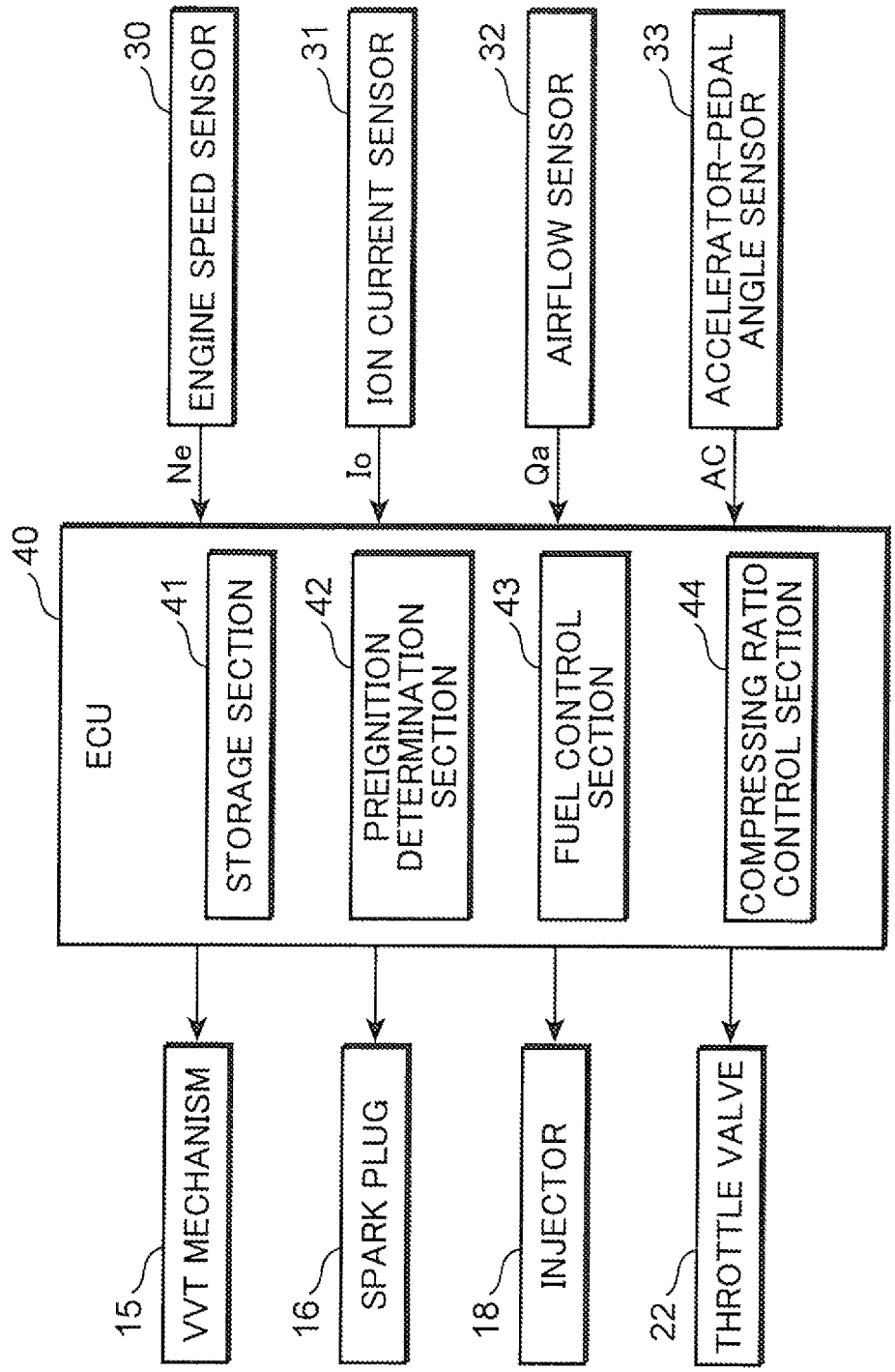
FIG. 2 is a block diagram showing the control system of the engine.

FIG. 2 is a block diagram showing the control system of the engine. An ECU 40 illustrated in FIG. 2 is a controller for comprehensively controlling various sections of the engine, and comprised of conventional components, such as a CPU, a ROM and a RAM.

A plurality of detection signals from various sensors are input into the ECU 40. Specifically, the ECU 40 is electrically connected to each of the engine speed sensor 30, the ion current sensor 31, the airflow sensor 32, and the accelerator-pedal angle sensor 33, and adapted to successively receive an input of information, such as an engine speed Ne, an ion current value Io, an intake air amount Qa, and an accelerator-pedal angle AC, as respective detection values of the sensors 30 to 33.

Further, the ECU 40 is electrically connected to each of the VVT mechanism 15, the spark plug 16, the injector 18 and the throttle valve 22, and adapted to output a driving control signal to each of these devices.

Specific functions of the ECU 40 will be described below. As major functional elements, the ECU 40 has a storage section 41, a preignition determination section 42, a fuel control section 43, and a compressing ratio control section 44.

Figure 4:
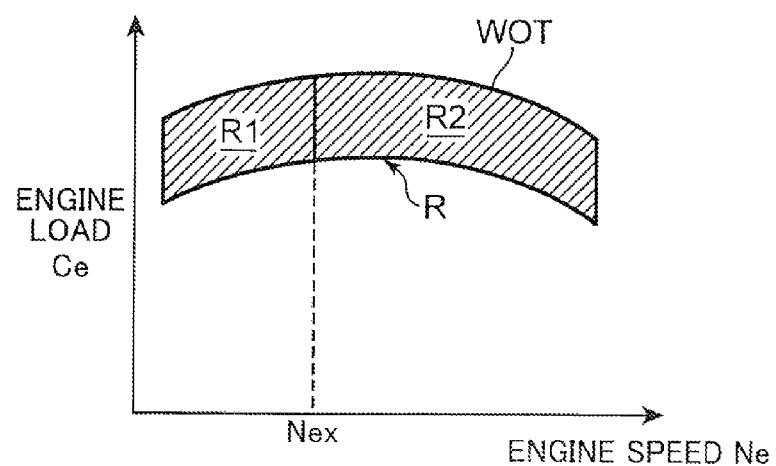
FIG. 4 is a chart showing in what engine operating region preignition is likely to occur.

The storage section 41 is provided as a means to store various data and programs necessary for controlling the engine. As one example of the data, a control map illustrated in FIG. 4 is stored in the storage section 41. The control map in FIG. 4 is formed by dividing a two-dimensional area into a plurality of regions in terms of a degree of risk of the occurrence of the preignition, wherein the horizontal axis represents the engine speed Ne, and the vertical axis represents an engine load Ce. In FIG. 4, a WOT (Wide Open Throttle) line is a maximum engine load line.

In the control map in FIG. 4, a preignition region R is defined as a region where the preignition is relatively more likely to occur. Specifically, the preignition is a phenomenon that an air fuel mixture self-ignites before the spark-ignited normal combustion initiation timing, so that the preignition is most likely to occur in an engine operating region adjacent to the maximum engine load line, in which air within the combustion chamber 6 has a high temperature and a high pressure. Thus, in FIG. 4, an upper region having a relatively high engine is defined as the preignition region R.

The preignition region R is further divided into a first preignition sub-region R1 and a second preignition sub-region R2, while setting a border line therebetween at a predetermined engine speed Nex (e.g., about 2500 rpm). The two sub-regions R1, R2 are different from each other in terms of a primary factor causing the preignition. For example, the preignition in the first preignition sub-region R1 defined on a low engine speed side is caused by an environment where fuel receives heat from high-temperature/high-pressure air in the combustion chamber 6 for a relatively long period of time. Differently, the preignition in the second preignition sub-region R2 defined on a high engine speed side is caused by an environment where a heat release amount per unit time is increased, and thereby the spark plug 16, a skirt portion of the exhaust valve 12, etc., are heated to high temperatures to serve as heat sources (heat points), regardless of shortening of the heat receiving period of fuel from the air in the combustion chamber 6.

The preignition determination section 42 is provided as a means to determine whether the preignition occurs, based on a detection value of the ion current sensor 31. More specifically, the preignition determination section 42 is operable, when an engine operating state is in the preignition region R, to identify a flame formation timing (substantial combustion initiation timing) from a detection value of the ion current sensor 31, and compare the identified flame formation timing with the normal combustion initiation timing to determine whether the preignition occurs. The normal combustion initiation timing is preliminarily obtained by an experimental test, a calculation operation or the like, and pre-stored in the storage section 41.

The fuel control section 43 is provided as a means to control an injection amount and an injection timing of fuel to be injected from the injector 18 into the combustion chamber 6. More specifically, the fuel control section 43 is operable to calculate a target fuel injection amount and a target fuel injection timing, based on information such as the engine speed Ne input from the engine speed sensor 30 and the intake air amount Qa input from the airflow sensor 32, and control a valve opening timing and a valve opening period of the injector 18, based on a result of the calculation.

Particularly, when the preignition is detected in the preignition region R (the first or second preignition sub-region R1 or R2), the fuel control section 43 is operable to execute a control operation of increasing the fuel injection amount from the injector 18 to enrich an in-cylinder air/fuel ratio. This control operation is intended to inject a relatively large amount of fuel so as to lower an in-cylinder temperature and thus lower a fuel temperature around the compression TDC to suppress the occurrence of the preignition. Further, according to need, the fuel control section 43 is operable to execute a control operation of delaying an injection timing of a part of injection fuel, i.e., fuel to be originally injected in the intake stroke, and inject the part of injection fuel in a medium or later phase of the (subsequent) compression stroke (i.e., inject fuel in the intake stroke and in the compression stroke in a split manner). This makes it possible to shorten the heat receiving period of fuel and thus lower the fuel temperature in the cylinder around the compression TDC so as to create an environment where the preignition is less likely to occur.

The compression ratio control section 44 is provided as a means to drive the VVT mechanism 15 in such a manner as to shift the closing timing of the intake valve 11 (hereinafter referred to as "intake valve closing timing" or "IVC timing") to variably set an effective compression ratio of the engine. Specifically, the intake valve closing (IVC) timing is normally set adjacent to a bottom dead center of the intake stroke (intake BDC) and on a retard side with respect to the intake BDC (specifically, at a timing slightly beyond the intake BDC). Based on the IVC timing set in this manner, it becomes possible to almost prevent air introduced into the combustion chamber 6 from being blown back into the intake port 9, so that a substantial compression ratio (effective compression ratio) of the engine is set to a value close to a geometrical compression ratio of the engine. In contrast, when the IVC timing is set to a point which is significantly late with respect to the intake BDC, a fairly large amount of blowback of intake air will occur, which causes a reduction in the effective compression ratio of the engine accordingly. The compression ratio control section 44 is operable to drive the VVT mechanism 15 in such a manner as to controllably increase and reduce a retard amount of the IVC timing to variably set the effective compression ratio of the engine.

Particularly, the compression ratio control section 44 is operable, when the preignition is detected in the first preignition sub-region R1, to retard the IVC timing to reduce the effective compression ratio, under a given condition. This makes it possible to lower the in-cylinder temperature/pressure so as to suppress the preignition. However, the control operation for lowering the effective compression ratio is executed only in the first preignition sub-region R1, but it is not executed in the second preignition sub-region R2. This is because the preignition in the second preignition sub-region R2 is caused by a heat point at the exhaust valve 12, the spark plug 16, etc. Thus, even if the effective compression ratio is reduced, an effect thereof on a temperature of the heat point is insignificant, and it is difficult to contribute to suppression of the preignition.

The term "intake valve closing (IVC) timing" in the above description is a closing timing on an assumption that an interval of a lift curve, except for ramp areas (buffer areas where a lift amount gently rises and falls), is defined as a valve opening period. Thus, it does not mean a timing when a lift amount of the intake valve 11 strictly becomes zero.

(3) Control Operation for Avoiding Preignition

A control operation to be performed by the ECU 40 configured as above will be described below. The following description will be made mainly about a control operation to be performed when the preignition is detected in the preignition region R, and an control operation to be performed just after the preignition is successfully avoided.

FIGS. 5 to 8 are flowcharts illustrating the control operations. Upon start of a processing routine illustrated in the flowchart in FIG. 5, the ECU 40 firstly executes a control operation of reading respective detection values of the sensors (Step S1). More specifically, respective values of the engine speed Ne, the ion current value Io, the intake air amount Qa and the accelerator-pedal angle AC are read from corresponding ones of the engine speed sensor 30, the ion current sensor 31, the airflow sensor 32 and the accelerator-pedal angle sensor 33, and input into the ECU 40.

Then, the ECU 40 executes, based on the information read in the Step S1, a control operation of determining whether the engine operating state is presently in the preignition region R illustrated in FIG. 4 (Step S3). More specifically, the present engine operating state is identified on the control map in FIG. 4, based on the engine speed Ne read in the Step S1, and an engine load Ce calculated from the intake air amount Qa (or the accelerator-pedal angle AC) read in the Step S1, and then it is determined whether the identified present engine operating state is included in the preignition region R.

When the determination in the Step S3 is NO, i.e., it is ascertained that the present engine operating state is out of the preignition region R, a normal control mode is maintained (Step S13), because such an engine operating state has no risk of the occurrence of the preignition, and thereby there is no need to execute after-mentioned control operations in Steps S6, S7, S11 (preignition avoidance control and return control). Specifically, parameters, such as the fuel injection amount, the fuel injection timing and the operating timing of the intake valve 11, are controlled according to respective normal target values preliminarily set depending on the engine operating state.

On the other hand, when the determination in the Step S3 is YES, i.e., it is ascertained that the present engine operating state is in the preignition region R, the ECU 40 executes, based on the ion current value Io read in the Step S1, a control operation of determining whether the preignition occurs (Step S4). More specifically, when the flame formation timing identified based on the ion current value Io is earlier than the pre-stored normal combustion initiation timing (a timing which is slightly later than the timing of the spark ignition (spark timing); e.g., the point t0 in FIG. 3) by a given time or more, it is determined that the preignition occurs.

When the determination in the Step S4 is YES, i.e., the occurrence of the preignition is ascertained, the ECU executes a control operation of determining whether the engine speed Ne read in the Step S1 is less than a predetermined threshold value Nex (Step S5). The threshold value Nex is the engine speed defining the border line between the first preignition sub-region R1 and the second preignition sub-region R2, as shown in FIG. 4.

In other words, the control operation in the Step S5 is intended to determine in which of the first preignition sub-region R1 and the second preignition sub-region R2 the present engine operating state is included, and estimate a type of the preignition which presently occurs. More specifically, when the present engine operating state is in the first preignition sub-region R1 on the low engine speed side, the preignition can be estimated to be a type caused by an excessively long period of heat receiving of fuel from air in the combustion chamber 6. On the other hand, when the present engine operating state is in the second preignition sub-region R2 on the high engine speed side, the preignition can be estimated to be a type caused by the spark plug 16 and the skirt portion of the exhaust valve 12 heated to high temperatures to serve as heat points.

When the determination in Step S5 is YES, i.e., it is ascertained that the engine speed Ne is less than the threshold value Nex and thus the preignition is detected in the first preignition sub-region R1, the ECU 40 executes a first preignition avoidance control as a special control mode for avoiding the preignition in the first preignition sub-region R1 (Step S6). On the other hand, when the determination in the Step S5 is NO, it is ascertained that the engine speed Ne is equal to or greater than the threshold value Nex and thus the preignition is detected in the second preignition sub-region R2, the ECU 40 executes a second preignition avoidance control different from the first preignition avoidance control (Step S7).

Figure 6:
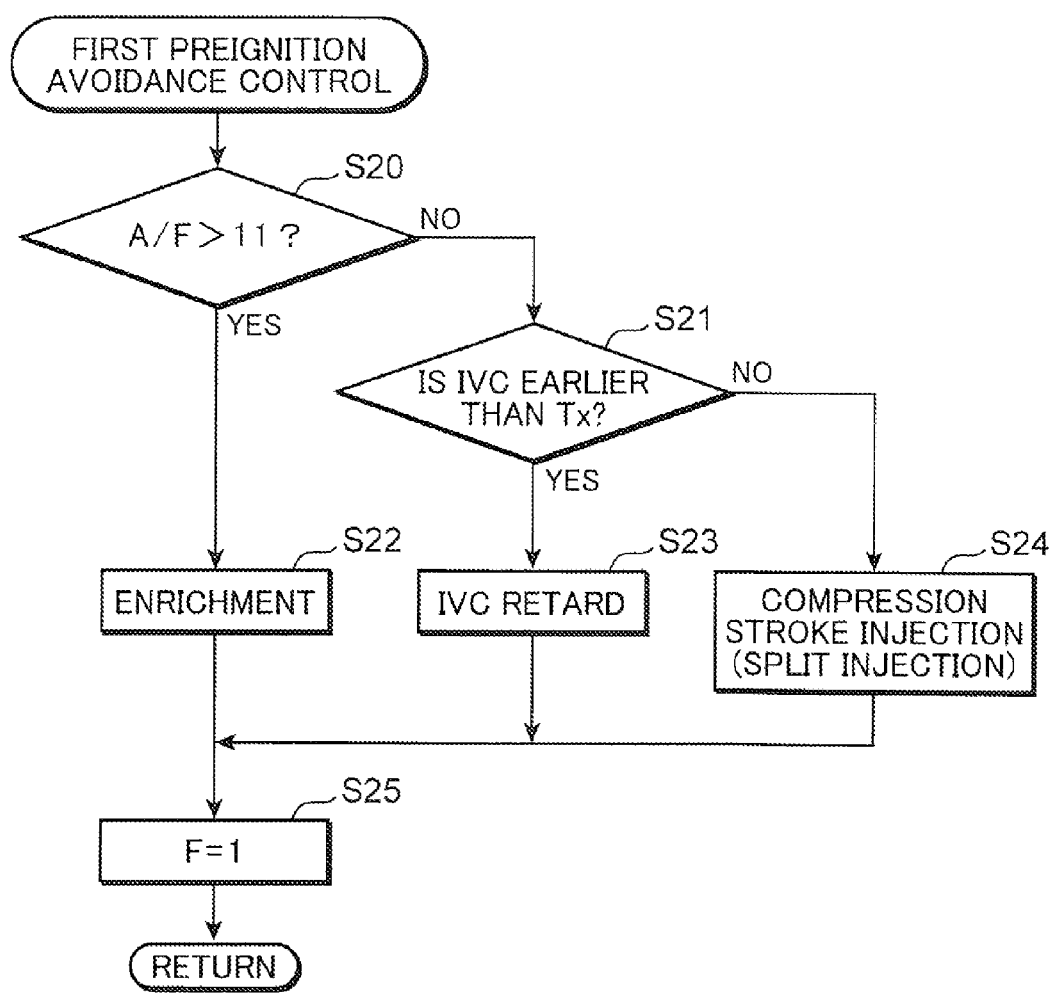
FIG. 6 is a flowchart showing details of a first preignition avoidance control subroutine included in the flowchart illustrated in FIG. 5.

With reference to FIG. 6, details of the first preignition avoidance control in the Step 6 will be specifically described. Upon start of the first preignition avoidance control, the ECU 40 firstly executes a control operation of determining whether a present setup value of the in-cylinder air-fuel (A/F) ratio is greater than 11 (Step S20). The threshold value (A/F ratio=11) for the determination in the Step S20 is an A/F limit value to be allowed during an after-mentioned control operation of enriching the A/F ratio in Step S22. If the A/F ratio is enriched to a value less than 11, such a rich A/F ratio is likely to cause smoke, and disadvantageous in terms of fuel economy. Thus, an A/F ratio as the A/F limit value for the enrichment is set to 11.

In the first preignition sub-region R1, the in-cylinder A/F ratio is initially set to a stoichiometric air/fuel ratio (=14.7) or a value slightly richer than the stoichiometric air/fuel ratio, i.e., a value leaner than the A/F limit value (=11). Consequently, the determination in the Step S20 is initially made as YES. Then, in the next Step S22, the ECU 40 executes a control operation of enriching the A/F ratio. More specifically, a fuel injection amount from the injector 18 is increased to enrich a present setup value of the in-cylinder A/F ratio by a given amount.

The enrichment of the A/F ratio is performed in a multi-stage (stepwise) manner. For example, when the present A/F ratio is 14.7 (stoichiometric air/fuel ratio), it is firstly enriched to a smaller value of 12.5. When the preignition cannot be avoided even after the first enrichment, the A/F ratio is further enriched to a smallest value of 11 (A/F limit value). Differently, in cases where the preignition is successfully avoided just after the first enrichment (14.7→12.5), the enrichment control operation is terminated at this timing.

In a situation where the preignition continuously occurs even after enriching the A/F ratio to 11 in the Step S22, the determination in the Step S40 is made as NO. Then, in Step S21, the ECU 40 executes a control operation of determining whether a present setup point of the intake valve closing (IVC) timing is earlier than a point Tx obtained by a control operation of maximally retarding the IVC timing in after-mentioned Step S23 (latest IVC timing Tx). The latest IVC timing Tx as a threshold value for the determination in the Step S21 is set to a point at which blowback of intake air occurs and the effective compression ratio of the engine is reduced to some extent with respect to the geometrical compression ratio of the engine (e.g., about 110 degrees CA after the intake BDC (ABDC)). If the IVC timing is retarded beyond the latest IVC timing Tx, an engine power output becomes insufficient due to significant reduction in effective compression ratio of the engine. Thus, the latest IVC timing Tx is set as an allowable maximum retard amount.

In the preignition sub-region R1, the IVC timing is initially set to a point at which almost no blowback of intake air occurs, e.g., about 30 degrees CA after the intake BDC (ABDC) of the intake stroke. Consequently, the determination in the Step S21 is initially made as YES. Then, in Step S23, the ECU 40 executes a control operation of retarding the IVC timing. More specifically, the VVT mechanism 15 is driven to retard the operating timing of the intake valve 11, so that a present setup point of the IVC timing is retarded by a given amount to reduce the effective compression ratio of the engine.

The IVC timing retard control operation is performed in a multi-stage (stepwise) manner, for example, by 10 degrees CA per stage. Specifically, the IVC timing is firstly retarded with respect to a present setup point thereof. Then, when the preignition cannot be avoided even after the first stage, it is additionally retarded by 10 degree CA. Subsequently, the IVC timing retard control operation will be continued by 10 degree CA per stage, until the IVC timing reaches the latest IVC timing Tx. Differently, in cases where the preignition is successfully avoided before reaching to the latest IVC timing Tx, the IVC timing retard control operation is terminated at this timing.

Figure 9A:
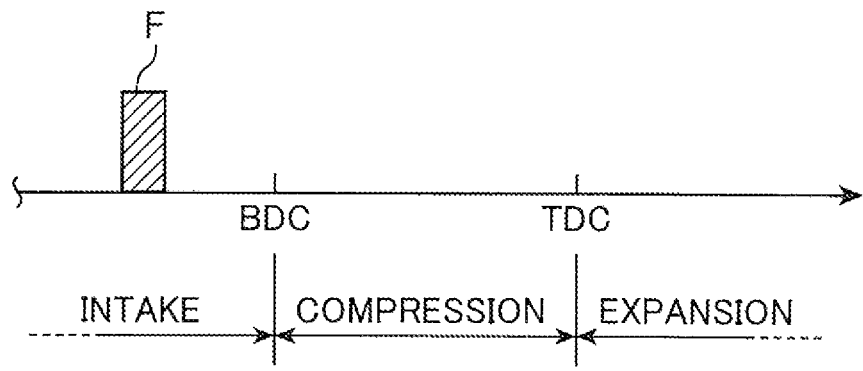
FIGS. 9A and 9B are explanatory diagrams showing a fuel injection timing, wherein FIG. 9A illustrated a fuel injection timing in a normal state.
Figure 9B:
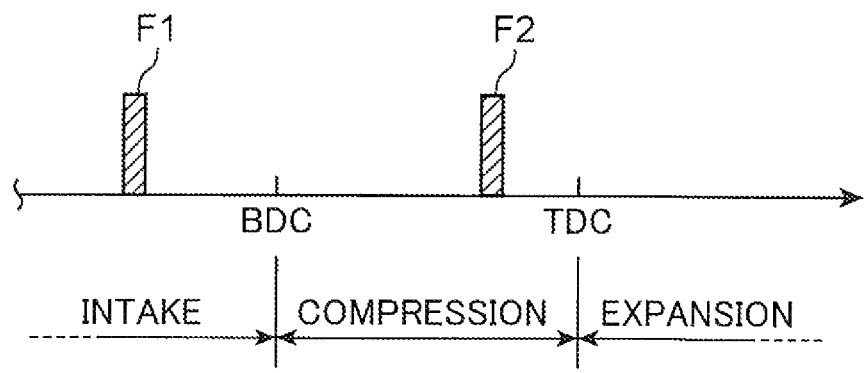

In a situation where the preignition continuously occurs even after retarding the IVC timing to the latest IVC timing Tx in the Step S23, the determination in the Step S21 is made as NO. Then, in Step S24, the ECU 40 executes a control operation of injecting a part of injection fuel in the compression stroke in a split manner (see F1, F2 in FIG. 9B). Specifically, as shown in FIG. 9A, generally, the entire injection fuel is normally injected in the intake stroke (see F in FIG. 15A). In the Step 42, as shown in FIG. 9B, an injection timing of a part of injection fuel is retarded to a medium or later phase of the compression stroke to allow the injection fuel to be injected in the intake and compression strokes in a split manner (see F1 and F2 in FIG. 15B).

As above, in the first preignition avoidance control, the A/F ratio enrichment (the Step S22), the IVC timing retard (the Step S23) and the compression stroke injection (split fuel injection) (the Step S24) are executed in this priority order.

Upon start of one of the control operations in the Steps S22, S23 and S24, a flag F (a default value of the flag is "0") is subsequently set to "1" (Step S25), and the control is returned to the main routine illustrated in FIG. 5.

FIG. 10 is a time chart showing in what manner each of the A/F ratio, the IVC timing and the fuel injection timing is changed with time, on an assumption that the preignition can be avoided only after executing all of the control operations in the Steps S22, S23 and S4. As can also be understood from FIG. 10, in the first preignition avoidance control, the control operation of enriching the A/F ratio in a multi-stage manner is firstly executed by priority. Then, when the preignition cannot be avoided even after maximally enriching the A/F ratio (to 11), the IVC timing is secondly retarded in a multi-stage manner. Then, when the preignition still cannot be avoided even after maximally retarding the IVC timing, the compression stroke injection (split fuel injection) is lastly executed.

Figure 5:
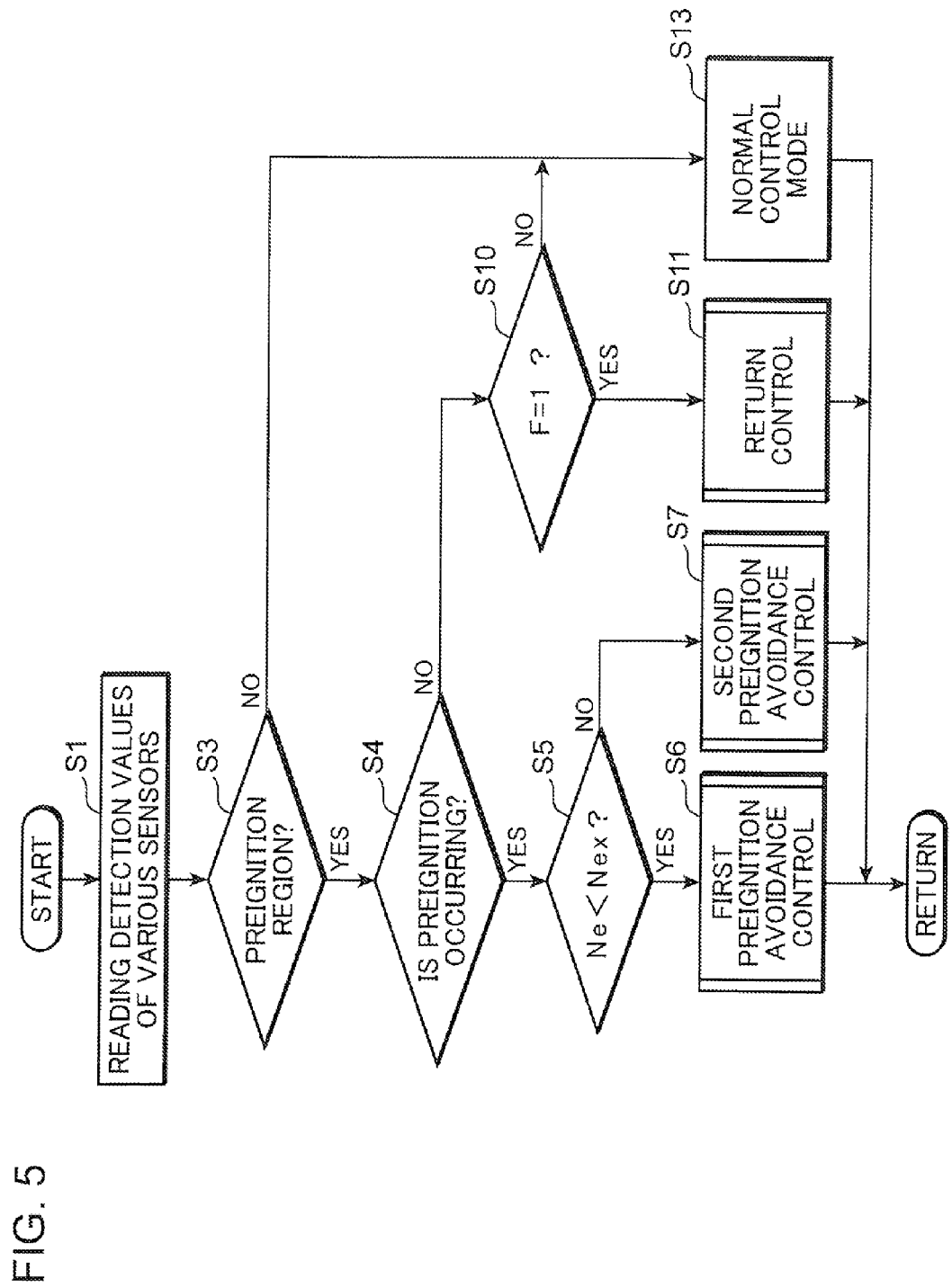
FIG. 5 is a flowchart showing a control operation to be performed when the preignition is detected.
Figure 7:
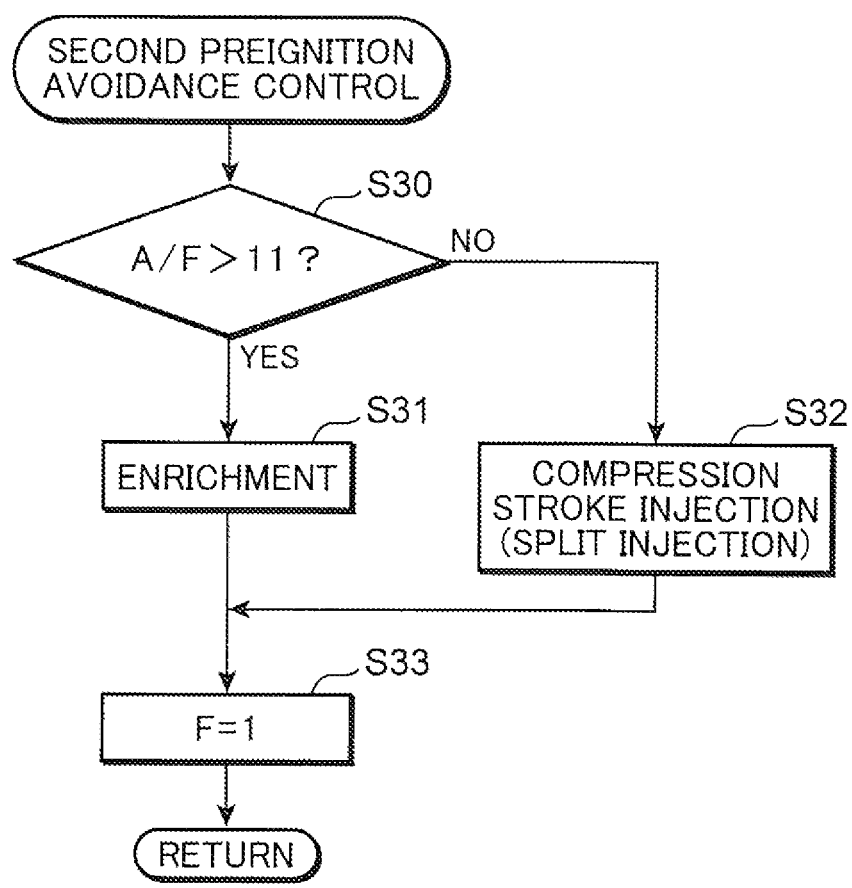
FIG. 7 is a flowchart showing details of a second preignition avoidance control subroutine included in the flowchart illustrated in FIG. 5.

With reference to FIG. 7, details of the second preignition avoidance control in the Step 7 illustrated in FIG. 5 will be specifically described. Upon start of the second preignition avoidance control, the ECU 40 firstly executes a control operation of determining whether a present setup value of the in-cylinder air-fuel (A/F) ratio is greater than 11 (Step S30). When the determination in the Step S30 is YES, i.e., it is ascertained that the A/F ratio is greater than 11, the A/F ratio enrichment control operation is performed in a multi-stage (stepwise) manner, for example, in the following two stages: 14.7→12.5→11, as with the control operation of the Step S22 in the first preignition avoidance control.

In a situation where the preignition continuously occurs even after enriching the A/F ratio to 11 in the Step S31, the determination in the Step S30 is made as NO. Then, in Step S32, the ECU 40 executes a control operation of injecting a part of injection fuel in the compression stroke in a split manner.

As above, in the second preignition avoidance control, the A/F ratio enrichment (Step S31) and the compression stroke injection (split fuel injection) (Step S32) are executed in this priority order. Further, differently from the first preignition avoidance control (FIG. 6), a control operation of retarding the IVC timing (corresponds to the control operation in Step S23 illustrated in FIG. 6) is not executed. Specifically, in the second preignition sub-region R2, the IVC timing is initially set to about 45 degrees CA after the intake BDC as a timing at which no blowback of intake air occurs. Even during the second preignition avoidance control, the initial timing is not retarded, so that the effective compression ratio is maintained constant.

Upon start of one of the control operations in the Steps S31 and S32, the flag F is subsequently set to "1" (Step S33), and the control is returned to the main routine illustrated in FIG. 5.

Figure 11:
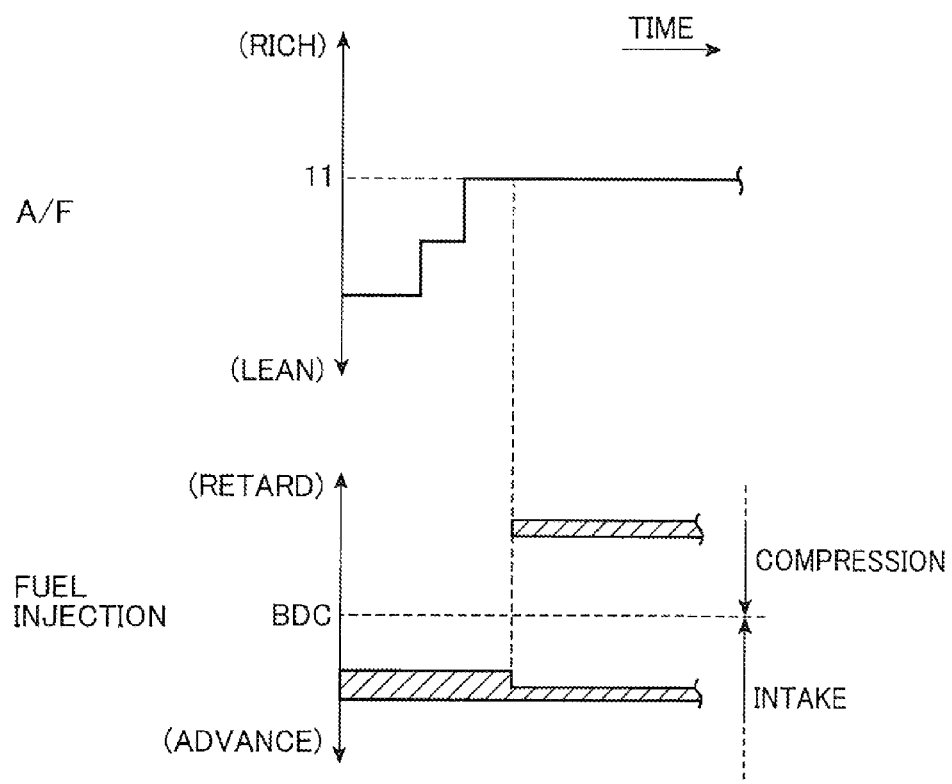
FIG. 11 is a time chart showing one example of an operation for the second preignition avoidance control, in a time-series manner.

FIG. 11 is a time chart showing in what manner each of the A/F ratio and the fuel injection timing is changed with time, on an assumption that the preignition can be avoided only after executing both of the control operations in the Steps S31 and S32. As can also be understood from FIG. 11, in the second preignition avoidance control, the control operation of enriching the A/F ratio in a multi-stage manner is firstly executed by priority. Then, when the preignition cannot be avoided even after maximally enriching the A/F ratio (to 11), the compression stroke injection (split fuel injection) is executed.

The following description will be made about a control operation to be performed when the occurrence of the preignition is successfully avoided as a result of the execution of one of the first and second preignition avoidance controls (FIGS. 6 and 7). In this case, the determination in the Step S4 is made as NO. Then, in Step S10, the ECU 40 executes a control operation of determining whether the flag F is "1". When the first or second preignition avoidance control is being executed, the flag is "1", and therefore the determination in Step S10 is made as YES. Then, in Step S11, the ECU 40 executes a return control for releasing the first or second preignition avoidance control to return the special control mode to the normal control mode.

FIG. 8 shows details of the return control in the Step S11. Upon start of the return control, the ECU 40 executes a control operation of determining whether the compression stroke injection (the Step S24 in FIG. 6; Step S32 in FIG. 7) is being executed (Step S40). When the determination in the Step 40 is YES, i.e., it is ascertained that the compression stroke injection is being executed, a control operation of returning the fuel injection timing to timing in the intake stroke which is a normal injection timing (Step S43).

In a situation where no preignition occurs after the fuel injection timing is returned to a normal timing (in the intake stroke), or the compression stroke injection is originally not executed, the determination in the Step S40 is made as NO. Then, in Step S41, the ECU 40 executes a control operation of determining whether the IVC timing is set on the retard side with respect to its original setup point.

In a situation where the IVC timing is retarded in the Step S23 illustrated in FIG. 6, the determination in the Step S41 is made as YES. Then, in Step S44, the ECU 40 executes a control operation of returning the IVC timing toward an advance side to increase the effective compression ratio.

The advancing of the IVC timing is performed in a multi-stage (stepwise) manner, as with the control operation in the Step S23 illustrated in FIG. 6, for example, by 10 degrees CA per stage. Specifically, the IVC timing is advanced with respect to a present setup point thereof by 10 degree CA. Then, when it is ascertained that no preignition occurs even after the advance, the IVC timing is additionally advanced by 10 degree CA. Subsequently, the IVC timing retard control operation will be continued by 10 degree CA per stage, until the IVC timing reaches a normal timing (at which no blowback of intake air occurs) and becomes approximately equal to the geometrical compression ratio.

In a situation where no preignition occurs after returning the IVC timing to the normal timing, or the IVC timing is not originally retarded, the determination in the Step S41 is made as NO. Then, in Step S42, the ECU 40 executes a control operation of determining whether the in-cylinder A/F ratio is enriched to a value richer than a normal value (which is equal to or close to the stoichiometric air/fuel ratio). When the determination in the Step S42 is YES, i.e., it is ascertained that the A/F ratio is enriched, the ECU 40 executes a control operation of returning the A/F ratio toward a lean side (the normal value) (Step S45).

The enleanment of the A/F ratio is performed in a multi-stage (stepwise) manner, as with the control operation in the Step S22 illustrated in FIG. 6 and the Step S31 illustrated in FIG. 7. For example, the in-cylinder A/F ratio is enleaned and returned to the normal value in the following two stages: 11→12.5→14.7.

When the A/F ratio is returned to the normal value after completing the control operation in the Step S45, the determination in the Step S42 is made as NO. Then, the flag F is set to "0" in Step S46), and the control is returned to the main routine in FIG. 5.

Figure 12:
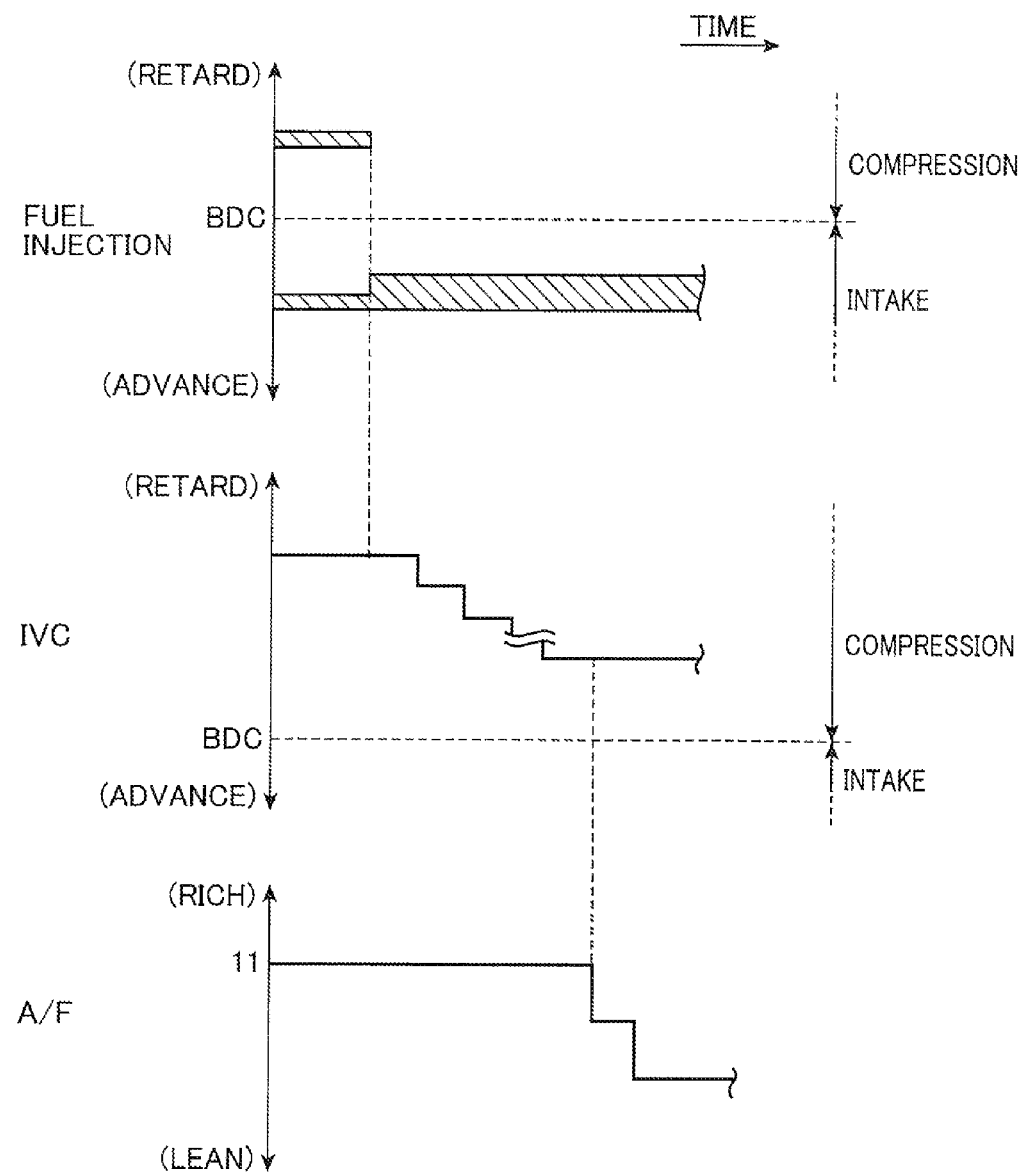
FIG. 12 is a time chart showing detains of a return control to be performed after the control in FIG. 10, in a time-series manner.
Figure 13:
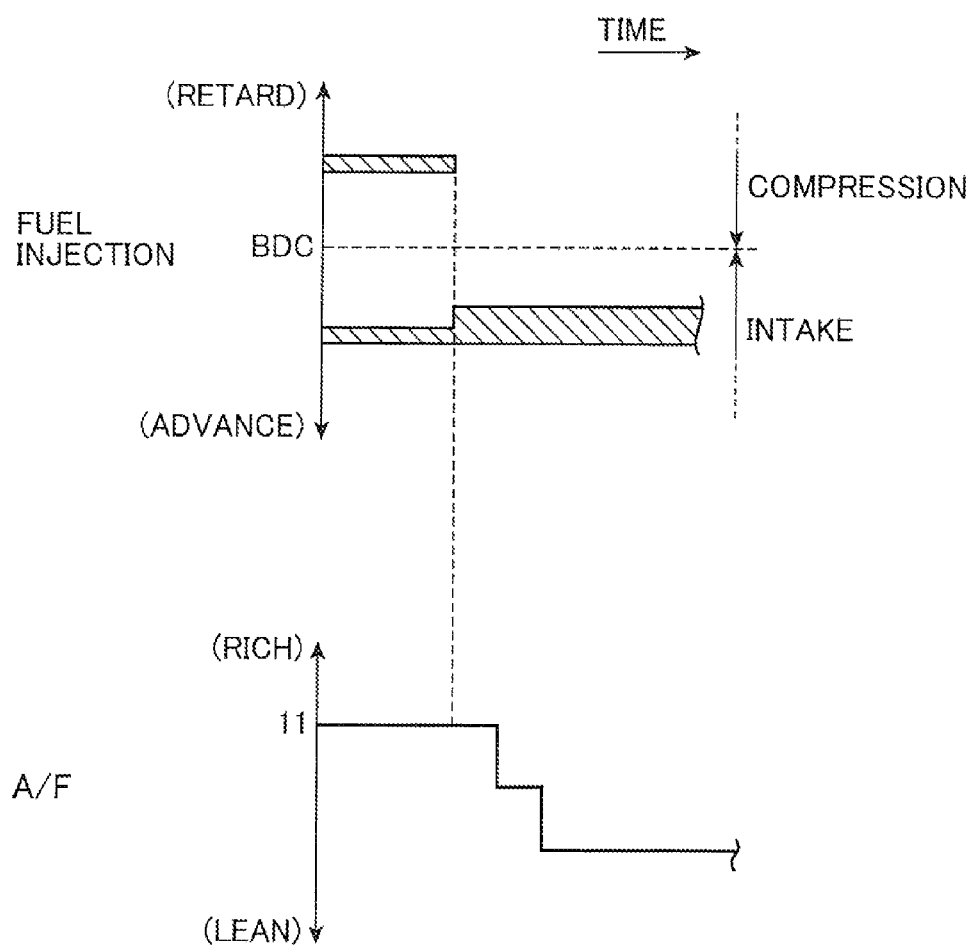
FIG. 13 is a time chart showing detains of a return control to be performed after the control in FIG. 11, in a time-series manner.

FIGS. 12 and 13 are time charts showing temporal changes in the fuel injection timing and the A/F ratio (and the IVC timing, in FIG. 12) during the return control. Specifically, FIG. 12 shows in what manner each value of the fuel injection timing, the A/F ratio and the IVC timing is changed by the return control which is performed after the first preignition avoidance control illustrated in FIG. 10, i.e., when all of the A/F ratio enrichment, the IVC timing retard and the compression stroke injection are required to avoid the preignition occurring in the first preignition sub-region R1.

As shown in FIG. 12, in the return from the first preignition avoidance control, the compression injection (split fuel injection) is firstly released to return the fuel injection timing to the normal timing (in the intake stroke). Then, when no preignition occurs after the fuel injection timing return, the control operation of advancing the IVC timing to the normal timing is executed in a multi-stage manner. Then, when no preignition occurs after the IVC timing advance, the control operation of enleaning the A/F ratio to the normal value is executed in a multi-stage manner.

FIG. 13 shows in what manner each value of the fuel injection timing and the A/F ratio is changed by the return control which is performed after the second preignition avoidance control illustrated in FIG. 11, i.e., after both of the A/F ratio enrichment and the compression injection (split fuel injection) are executed in order to avoid the preignition occurring in the second preignition sub-region R2. As shown in FIG. 13, in the return from the second preignition avoidance control, the compression injection is firstly released, and subsequently the control operation of enleaning the A/F ratio is executed.

(4) Functions/Effects

As described above, in the spark ignition engine according to the above embodiment, when the preignition is detected based on a detection value of the ion current sensor 31, one of the first and second preignition avoidance controls is selectively executed depending on whether the engine speed Ne is below or above the predetermined threshold value Nex (i.e., depending on in which of the first and second preignition sub-regions RE R2 the preignition occurs). Specifically, in the first preignition avoidance control which is selected when the engine speed Ne is less than the threshold value Nex, the control operation of enriching the in-cylinder air/fuel ratio (Step S22), the control operation of retarding the IVC timing to reduce the effective compression ratio (Step S23), and the control operation of injecting a part of injection fuel in the medium or later phase of the compression stroke (Step S24), are executed in this priority order. On the other hand, in the second preignition avoidance control which is selected when the engine speed Ne is equal to or greater than the threshold value Nex, the control operation of enriching the in-cylinder air/fuel ratio (Step S31) and the control operation of injecting a part of injection fuel in the compression stroke (Step S32) are executed in this priority order. In other words, in the second preignition avoidance control, differently from in the first preignition avoidance control, the control operation of retarding the IVC timing is not executed, so that the effective compression ratio is maintained constant. This feature has an advantage of being able to effectively suppress the occurrence of the preignition, while maximally avoiding deterioration in emission performance and lowering in engine power output.

Specifically, in the above embodiment, in the first and second preignition avoidance controls to be executed when the preignition is detected, the control operation of enriching the air/fuel ratio is firstly performed, and the control operation of injecting a part of injection fuel in the compression stroke is lastly performed, so that it becomes possible to effectively suppress the occurrence of the preignition, while maximally avoiding deterioration in emission performance.

For example, if the compression stroke injection (the control operation of injecting a part of injection fuel in the medium or later phase of the compression stroke) is firstly executed, a large amount of unburned carbon is liable to remain in exhaust gas, resulting in the occurrence of smoke. In the above embodiment, in the event of the preignition, the air/fuel ratio is firstly enriched to lower the in-cylinder temperature, and then the compression stroke injection is executed only if the preignition cannot be avoided even after the air/fuel ratio enrichment. This provides an advantage of being able to maximally avoid the occurrence of smoke.

Particularly, when the preignition is detected in the engine operating region where the engine speed Ne is less than the threshold value Nex (i.e., the first preignition avoidance control is selected), the control operation of retarding the IVC timing to reduce the effective compression ratio is executed as a control operation having a priority lower than that of the air/fuel ratio enrichment and higher than that of the compression stroke injection. This provides an advantage of being able to reduce a frequency of execution of the compression stroke injection so as to effectively prevent deterioration in emission performance due to the occurrence of smoke.

Specifically, after the air/fuel ratio enrichment, the control operation for reducing the effective compression ratio of the engine is performed to lower the in-cylinder temperature/pressure, and then the compression stroke injection is executed only if the preignition cannot be avoided even after reducing the effective compression ratio, so that it becomes possible to avoid the preignition without executing the compression stroke injection, in a higher possibility. This makes it possible to suppress the preignition while significantly reducing the frequency of execution of the compression stroke injection to maximally avoiding the occurrence of smoke.

In addition, the effective compression ratio reduction is executed only when the preignition is detected in the engine operation region where the engine speed Ne is less than the threshold value Nex (i.e., only during the first preignition avoidance control) without being executed when the preignition is detected in the engine operation region where the engine speed Ne is equal to or greater than the threshold value Nex (i.e., during the second preignition avoidance control). This provided an advantage of being able to suppress the preignition in an adequate and reliable manner, while selecting only effective measures depending on a type of preignition.

Specifically, the preignition occurring when the engine speed Ne is relatively high is caused by a heat point at the exhaust valve 12, the spark plug 16, etc. Thus, even if the effective compression ratio is reduced, an effect thereof on a temperature of the heat point is insignificant, and it is difficult to contribute to suppression of the preignition. Therefore, in the second preignition avoidance control to be performed in the event of this type of preignition, when the preignition cannot be avoided even after enriching the air/fuel ratio, the compression stroke injection is immediately performed without performing the control operation of reducing the effective compression ratio. In this manner, the control operation of reducing the effective compression ratio, i.e., a control operation ineffective as the measures, is omitted, so that it becomes possible to reliably suppress the preignition, while avoiding taking wasted time for such an ineffective control operation.

In the above embodiment, in the first preignition avoidance control to be performed when the engine speed Ne is less than the threshold value Nex, when the preignition cannot be avoided even after enriching the air/fuel ratio, the IVC timing is retarded to reduce the effective compression ratio. The two control operations (the air/fuel ratio enrichment and the effective compression ratio reduction) have no impact on emission performance (occurrence of smoke). Thus, in view of only this point, it is considered that the effective compression ratio reduction may be performed in advance of the air/fuel ratio enrichment. However, the control operation for reducing the effective compression ratio involves not only a problem of causing lowering in engine power output, but also a problem of poor control response. Specifically, particularly, when the VVT mechanism 15 is comprised of a hydraulic type, a relatively long response lag occurs in an operation of changing an operating timing of the intake valve 11. Thus, it can be said that the control operation of retarding the IVC timing to reduce the effective compression ratio is inferior to the control operation of increasing the fuel injection amount from the injector 18 to enrich the air/fuel ratio, in terms of control response.

Therefore, in the above embodiment, during the first preignition avoidance control, the air/fuel ratio enrichment is executed in advance of the effective compression ratio reduction. This provided an advantage of being able to maximally avoid lowering in engine power output, based on giving a lower priority to the effective compression ratio reduction, and rapidly suppress the preignition just after the occurrence thereof, based on giving a higher priority to the air/fuel ratio enrichment which is excellent in control response.

In the above embodiment, as shown in FIG. 10, during the first preignition avoidance control, the air/fuel ratio enrichment is firstly performed in a multi-stage manner, and then, when the preignition is detected even after maximally enriching the air/fuel ratio, the IVC timing is retarded to reduce the effective compression ratio. On the other hand, as shown in FIG. 11, during the second preignition control, the air/fuel ratio is firstly enriched in a multi-stage manner, and then, when the preignition is detected even after maximally enriching the air/fuel ratio, a part of injection fuel is injected in the compression stroke. As above, the air/fuel ratio enrichment is performed in a multi-stage manner. Thus, for example, in cases where the severity of the preignition is mild, and the preignition can be avoided only by slightly enriching the air/fuel ratio, it becomes possible to prevent the air/fuel ratio from being excessively enriched so as to minimize deterioration in fuel economy, etc. On the other hand, in cases where the preignition cannot be avoided even after maximally enriching the air/fuel ratio, the preignition can be suppressed based on the effective compression ratio reduction or the compression stroke injection (split fuel injection), so that it becomes possible to reliably avoid the preignition while preventing the air/fuel ratio from being excessively enriched, even if the preignition is relatively serious.

In the first preignition avoidance control (FIG. 10), the effective compression ratio reduction (IVC timing retard) is performed in a multi-stage manner, and then, when the preignition is detected even after maximally reducing the effective compression ratio, the compression stroke injection (split fuel injection) is executed. This feature has an advantage of being able to more reliably avoid the preignition while preventing an engine power output from being significantly lowered due to excessive reduction in effective compression ratio.

In the above embodiment, in cases where all of the air/fuel ratio enrichment, the effective compression ratio reduction (IVC timing retard) and the compression stroke injection (split fuel injection), are required to avoid the preignition in the first preignition avoidance control, when the first preignition avoidance control, i.e., the special control mode, is returned to the normal control mode, the compression stroke injection (split fuel injection) is firstly released to return the fuel injection timing to a timing in the intake stroke, and then, when no preignition is detected after the fuel injection timing return, the IVC timing is secondly returned to an advance side to increase the effective compression ratio, whereafter, when no preignition is detected after the effective compression ratio increase, the air/fuel ratio is finally returned to a lean side, as shown in FIG. 12. In this feature, when the preignition is successfully avoided, the compression stroke injection (split fuel injection) is firstly released to eliminate a risk of the occurrence of smoke or the like. This makes it possible to minimize a time period where emission performance deteriorates. Subsequently, the reduced effective compression ratio is increased to return the lowered engine power output to its original value, and the enriched air/fuel ratio is returned to the lean side. This makes it possible to adequately return the special control mode to the normal control mode while ensuring emission performance and engine power output on a priority basis.

On the other hand, in cases where both of the air/fuel ratio enrichment and the compression stroke injection (split fuel injection) are required to avoid the preignition in the second preignition avoidance control, when the second preignition avoidance control, i.e., the special control mode, is returned to the normal control mode, the compression stroke injection (split fuel injection) is firstly released to return the fuel injection timing to a timing in the intake stroke, and then, when no preignition is detected after the fuel injection timing return, the air/fuel ratio is finally returned to a lean side, as shown in FIG. 13. This feature also makes it possible to adequately return the special control mode to the normal control mode while minimizing a time period where emission performance deteriorates.

In the above embodiment, when the control operation of reducing the effective compression ratio (Step S23) is performed in the first preignition avoidance control, the effective compression ratio is reduced by retarding the IVC timing set to a point where no blowback of intake air occurs (e.g., about 30 degrees CA ABDC of the intake stroke), farther toward the retard side (i.e., by causing blowback of intake air). However, a technique for reducing the effective compression ratio is not limited thereto. For example, the effective compression ratio may also be reduced by advancing the IVC timing to the advance side with respect to the intake BDC. However, in this case, the operating timing of the intake valve 11 has to be largely changed, which causes a problem of deterioration in control response due to an increase in control amount of the VVT mechanism 15. In order to avoid this problem, it is contemplated to set the normal (initial) point of the IVC timing to be approximately equal to the intake BDC or on the advance side with respect to the intake BDC. However, in this case, it is impossible to sufficiently utilize induction inertial, which leads to lowering in engine power output.

In view of this, it is advantageous that a point of the IVC timing in the normal state (where no preignition occurs) is set on the retard side with respect to an intake BDC, and, when it is necessary to reduce the effective compression ratio, the IVC timing is retarded with respect to the normal point, as in the above embodiment, in terms of a capability of efficiently reducing the effective compression ratio according to need, while sufficiently ensuring an engine power output in the normal state.

In the above embodiment, for example, as shown in FIG. 9A, a point of the fuel injection timing in the normal state where no preignition occurs is set to one time in the intake stroke (i.e., injection fuel is entirely injected in the intake stroke once). Alternatively, as long as the normal point of normal fuel injection timing is in the intake stroke, the injection fuel may be injected in the intake stroke plural times in a split manner.

In the above embodiment, the ion current sensor 31 is provided as a separate component from the spark plug 16, and a flame formation timing is detected by the ion current sensor 31, to determine whether the preignition occurs. Alternatively, the spark plug 16 may be additionally used as the ion current sensor 31 by modifying the spark plug 16 to allow a center electrode (plug electrode) thereof to be applied with a bias voltage for ion current detection. In this case, during a period where a spark is discharged from the spark plug 16 (i.e., a period where a high discharge voltage is applied to the spark electrode), the bias voltage cannot be applied to the plug electrode, and thereby it becomes impossible to detect an ion current. However, an air-fuel mixture seldom self-ignites suddenly at a timing equal to a spark discharge timing, so that it would be possible to certainly detect the preignition.

In the above embodiment, the preignition is detected based on a flame detection timing from the ion current sensor 31. Alternatively, the preignition may be detected, for example, by providing, in the engine body 1, a vibration sensor (knocking sensor) for use in detection of knocking or the like, and acquiring/analyzing a detection value of the vibration sensor.

In fact, even if a level of vibration detected by the vibration sensor is simply analyzed, it is unable to distinguish whether the detected vibration is knocking (a phenomenon that end gas self-ignites during flame propagation after spark ignition) or the preignition (a phenomenon that an air-fuel mixture self-ignites before the spark-ignited normal combustion initiation timing), and thereby it is impossible to accurately detect the preignition. Therefore, in order to adequately detect the preignition using the vibration sensor, a technique may be employed which is designed to analyze a change in detection value of the vibration sensor, while intentionally shifting the spark timing. This makes it possible to detect the preignition while accurately distinguishing it from the knocking.

For example, in a low engine speed/high engine load region, spark ignition of the spark plug is typically performed at a timing equal to the compression TDC or slightly on the retard side with respect to the compression TDC. If the knocking occurs in the low engine speed/high engine load region where the spark timing is set in the above point, a large level of vibration is detected by the vibration sensor. On the other hand, when the spark timing is retarded with respect to the above point, the knocking is suppressed, and thereby the vibration level is lowered along with retard of the spark timing. Differently, when the preignition occurs, self-ignition occurs irrespective of the spark timing. In other words, even if the spark timing is retarded, the preignition is not suppressed. Thus, the vibration level is not lowered. Based on this characteristic, the preignition can be detected using the vibration sensor by analyzing a change in the vibration level along with retard of the spark timing.

(5) Outline

An outline of features and effects of the invention disclosed based on the above embodiment will be described below.

The present invention is directed to a method of controlling a spark-ignition engine which comprises a detection device for detecting a preignition which is a phenomenon that an air-fuel mixture self-ignites before a spark-ignited normal combustion initiation timing, an injector for directly injecting fuel into a cylinder, and a variable mechanism for variably setting an intake valve closing timing. The method comprises the steps of: executing a first preignition avoidance control as a control mode to be performed when the preignition is detected based on a detection value of the detection device, and it is ascertained that an engine speed is less than a predetermined value; and executing a second preignition avoidance control as a control mode to be performed when the preignition is detected based on the detection value of the detection device, and it is ascertained that the engine speed is equal to or greater than the predetermined value. The first preignition avoidance control includes a first control operation of increasing a fuel injection amount from the injector to enrich an air/fuel ratio in the cylinder, a second control operation of, when the preignition is detected even after the first control operation, shifting the intake valve closing timing using the variable mechanism to reduce an effective compression ratio of the engine, and a third control operation of, when the preignition is detected even after the second control operation, retarding an injection timing of a part of fuel to be injected from the injector, to a medium or later phase of a compression stroke. The second preignition avoidance control includes a fourth control operation of increasing a fuel injection amount from the injector to enrich the in-cylinder air/fuel ratio, a fifth control operation of, when the preignition is detected even after the fourth control operation, retarding an injection timing of a part of fuel to be injected from the injector, to the medium or later phase of the compression stroke.

The present invention is also directed to a control system for a spark-ignition engine. The control system comprises: a detection device for detecting a preignition which is a phenomenon that an air-fuel mixture self-ignites before a spark-ignited normal combustion initiation timing; an injector for directly injecting fuel into a cylinder; a variable mechanism for variably setting an intake valve closing timing; and a controller for controlling the injector and the variable mechanism. The controller is operable to execute: a first preignition avoidance control as a control mode to be performed when the preignition is detected based on a detection value of the detection device, and it is ascertained that an engine speed is less than a predetermined value; and a second preignition avoidance control as a control mode to be performed when the preignition is detected based on the detection value of the detection device, and it is ascertained that the engine speed is equal to or greater than the predetermined value. The first preignition avoidance control includes a first control operation of increasing a fuel injection amount from the injector to enrich an air/fuel ratio in the cylinder, a second control operation of, when the preignition is detected even after the first control operation, shifting the intake valve closing timing using the variable mechanism to reduce an effective compression ratio of the engine, and a third control operation of, when the preignition is detected even after the second control operation, retarding an injection timing of a part of fuel to be injected from the injector, to a medium or later phase of a compression stroke. The second preignition avoidance control includes a fourth control operation of increasing a fuel injection amount from the injector to enrich the in-cylinder air/fuel ratio, a fifth control operation of, when the preignition is detected even after the fourth control operation, retarding an injection timing of a part of fuel to be injected from the injector, to the medium or later phase of the compression stroke.

In the present invention, in the first and second preignition avoidance controls to be executed when the preignition is detected, the control operation of enriching the air/fuel ratio is firstly performed, and the control operation of injecting a part of the fuel in the compression stroke is lastly performed, so that it becomes possible to effectively suppress the occurrence of the preignition, while maximally avoiding the occurrence of smoke due to the compression stroke injection.

Particularly, when the preignition is detected in an engine operating region where the engine speed is less than the predetermined value (i.e., the first preignition avoidance control is selected), the control operation of shifting the intake valve closing timing to reduce the effective compression ratio is executed as a control operation having a priority lower than that of the air/fuel ratio enrichment and higher than that of the compression stroke injection. This makes it possible to reduce a frequency of execution of the compression stroke injection so as to effectively prevent deterioration in emission performance due to the occurrence of smoke.

In addition, during the first preignition avoidance control, the air/fuel ratio enrichment is executed in advance of the effective compression ratio reduction. This makes it possible to maximally avoid lowering in engine power output, and rapidly suppress the preignition just after the occurrence thereof.

Further, the control operation for reducing the effective compression ratio is executed only when the preignition is detected in the engine operation region where the engine speed is less than the predetermined value (i.e., only during the first preignition avoidance control) without being executed when the preignition is detected in an engine operation region where the engine speed is equal to or greater than the predetermined value (i.e., during the second preignition avoidance control). This makes it possible to suppress the preignition in an adequate and reliable manner, while selecting only effective measures depending on a type of preignition.

Preferably, in the control method of the present invention, during reducing the effective compression ratio in the first preignition avoidance control, the intake valve closing timing is shifted from a point on a retard side with respect to a bottom dead center and at which no blowback of intake air occurs, farther toward the retard side.

Preferably, in the control system of the present invention, the controller is operable, during reducing the effective compression ratio in the first preignition avoidance control, to shift the intake valve closing timing from a point on a retard side with respect to a bottom dead center and at which no blowback of intake air occurs, farther toward the retard side.

The above features makes it possible to efficiently reduce the effective compression ratio according to need, while sufficiently ensuring an engine power output in a normal state.

Preferably, in the method of the present invention, the first preignition avoidance control is executed in such a manner as to enrich the air/fuel ratio in a multi-stage manner, and then, when the preignition is detected even after maximally enriching the air/fuel ratio, to reduce the effective compression ratio.

Preferably, the second preignition avoidance control is executed in such a manner as to enrich the air/fuel ratio in a multi-stage manner, and then, when the preignition is detected even after maximally enriching the air/fuel ratio, to retard the injection timing of a part of the fuel.

Preferably, in the control system of the present invention, the controller is operable to execute the first preignition avoidance control in such a manner as to enrich the air/fuel ratio in a multi-stage manner, and then, when the preignition is detected even after maximally enriching the air/fuel ratio, to reduce the effective compression ratio.

Preferably, the controller is operable to execute the second preignition avoidance control in such a manner as to enrich the air/fuel ratio in a multi-stage manner, and then, when the preignition is detected even after maximally enriching the air/fuel ratio, to retard the injection timing of a part of the fuel.

According to the above features, the air/fuel ratio enrichment is performed in a multi-stage manner. Thus, for example, in cases where the severity of the preignition is mild, and the preignition can be avoided only by slightly enriching the air/fuel ratio, it becomes possible to prevent the air/fuel ratio from being excessively enriched so as to minimize deterioration in fuel economy, etc. On the other hand, in cases where the preignition cannot be avoided even after maximally enriching the air/fuel ratio, the preignition can be suppressed based on the effective compression ratio reduction or the fuel injection timing retard, so that it becomes possible to reliably avoid the preignition while preventing the air/fuel ratio from being excessively enriched, even if the preignition is relatively serious.

Preferably, in the method of the present invention, the first preignition avoidance control is executed in such a manner as to reduce the effective compression ratio in a multi-stage manner, and then, when the preignition is detected even after maximally reducing the effective compression ratio, to retard the injection timing of a part of the fuel.

Preferably, in the control system of the present invention, the controller is operable to execute the first preignition avoidance control in such a manner as to reduce the effective compression ratio in a multi-stage manner, and then, when the preignition is detected even after maximally reducing the effective compression ratio, to retard the injection timing of a part of the fuel.

The above features makes it possible to more reliably avoid the preignition while preventing an engine power output from being significantly lowered.

This application is based on Japanese patent application No. 2010-081261, filed in Japan Patent Office on Mar. 31, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method of controlling a spark-ignition engine which comprises a detection device for detecting a preignition which is a phenomenon that an air-fuel mixture self-ignites before a spark-ignited normal combustion initiation timing, an injector for directly injecting fuel into a cylinder, and a variable mechanism for variably setting an intake valve closing timing, the method comprising the steps of:

executing a first preignition avoidance control as a control mode to be performed when the preignition is detected based on a detection value of the detection device, and it is ascertained that an engine speed is less than a predetermined value; and executing a second preignition avoidance control as a control mode to be performed when the preignition is detected based on the detection value of the detection device, and it is ascertained that the engine speed is equal to or greater than the predetermined value, wherein;

the first preignition avoidance control includes an A/F control operation of increasing a fuel injection amount from the injector to enrich an air/fuel ratio in the cylinder, a compression ratio control operation of, when the preignition is detected even after the A/F control operation, shifting the intake valve closing timing using the variable mechanism to reduce an effective compression ratio of the engine;

the second preignition avoidance control includes an A/F control operation of increasing a fuel injection amount from the injector to enrich the in-cylinder air/fuel ratio, an injection timing control operation of, when the preignition is detected even after the A/F control operation, retarding an injection timing of a part of fuel to be injected from the injector, to the medium or later phase of the compression stroke;

the first preignition avoidance control is executed in such a manner as to enrich the air/fuel ratio in a multi-stage manner, and then, when the preignition is detected even after maximally enriching the air/fuel ratio, to reduce the effective compression ratio; and the second preignition avoidance control is executed in such a manner as to enrich the air/fuel ratio in a multi-stage manner, and then, when the preignition is detected even after maximally enriching the air/fuel ratio, to retard the injection timing of a part of the fuel.

2. The method as defined in claim 1, wherein, during reducing the effective compression ratio in the first preignition avoidance control, the intake valve closing timing is shifted from a point on a retard side with respect to a bottom dead center and at which no blowback of intake air occurs, farther toward the retard side.

3. The method as defined in claim 1, wherein the first preignition avoidance control further includes an injection timing control operation of, when the preignition is detected even after the compression ratio control operation, retarding an injection timing of a part of fuel to be injected from the injector, to a medium or later phase of a compression stroke.

4. The method as defined in claim 3, wherein the first preignition avoidance control is executed in such a manner as to reduce the effective compression ratio in a multi-stage manner, and then, when the preignition is detected even after maximally reducing the effective compression ratio, to retard the injection timing of a part of the fuel.

5. A control system for a spark-ignition engine, comprising: a detection device for detecting a preignition which is a phenomenon that an air-fuel mixture self-ignites before a spark-ignited normal combustion initiation timing; an injector for directly injecting fuel into a cylinder; a variable mechanism for variably setting an intake valve closing timing; and a controller for controlling the injector and the variable mechanism, wherein the controller is operable to execute: a first preignition avoidance control as a control mode to be performed when the preignition is detected based on a detection value of the detection device, and it is ascertained that an engine speed is less than a predetermined value; and a second preignition avoidance control as a control mode to be performed when the preignition is detected based on the detection value of the detection device, and it is ascertained that the engine speed is equal to or greater than the predetermined value, wherein;

the first preignition avoidance control includes an A/F control operation of increasing a fuel injection amount from the injector to enrich an air/fuel ratio in the cylinder, a compression ratio control operation of, when the preignition is detected even after the A/F control operation, shifting the intake valve closing timing using the variable mechanism to reduce an effective compression ratio of the engine;

the second preignition avoidance control includes an A/F control operation of increasing a fuel injection amount from the injector to enrich the in-cylinder air/fuel ratio, an injection timing control operation of, when the preignition is detected even after the A/F control operation, retarding an injection timing of a part of fuel to be injected from the injector, to the medium or later phase of the compression stroke;

the first preignition avoidance control is executed in such a manner as to enrich the air/fuel ratio in a multi-stage manner, and then, when the preignition is detected even after maximally enriching the air/fuel ratio, to reduce the effective compression ratio; and the second preignition avoidance control is executed in such a manner as to enrich the air/fuel ratio in a multi-stage manner, and then, when the preignition is detected even after maximally enriching the air/fuel ratio, to retard the injection timing of a part of the fuel.

6. The control system as defined in claim 5, wherein the controller is operable, during reducing the effective compression ratio in the first preignition avoidance control, to shift the intake valve closing timing from a point on a retard side with respect to a bottom dead center and at which no blowback of intake air occurs, farther toward the retard side.

7. The control system as defined in claim 5, wherein the first preignition avoidance control further includes an injection timing control operation of, when the preignition is detected even after the compression ratio control operation, retarding an injection timing of a part of fuel to be injected from the injector, to a medium or later phase of a compression stroke.

8. The control system as defined in claim 7, wherein the controller is operable to execute the first preignition avoidance control in such a manner as to reduce the effective compression ratio in a multi-stage manner, and then, when the preignition is detected even after maximally reducing the effective compression ratio, to retard the injection timing of a part of the fuel.

* * * * *